Dec. 30, 1952     V. D. GRIEVE     2,623,768
BOX AND CONTAINER HANDLE
Filed June 25, 1951
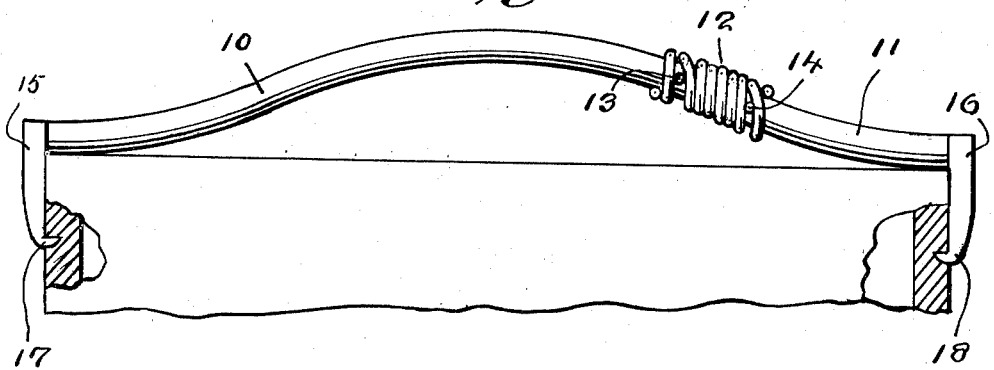
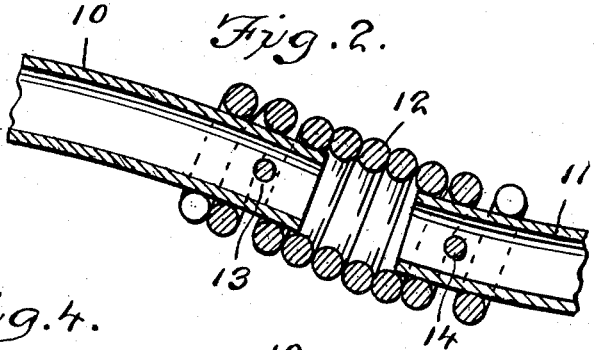
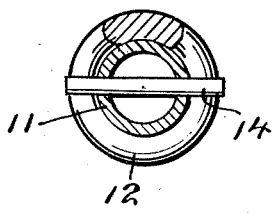
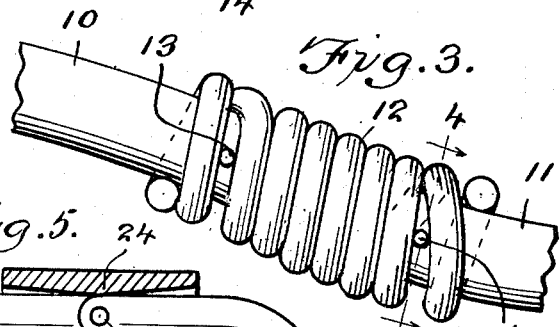
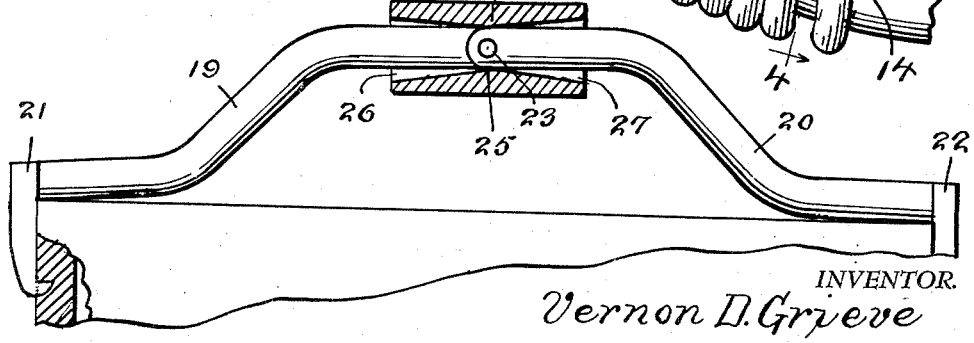
INVENTOR.
Vernon D. Grieve
BY Victor J. Evans & Co.
ATTORNEYS Patented Dec. 30, 1952

2,623,768

UNITED STATES PATENT OFFICE 2,623,768

BOX AND CONTAINER HANDLE

Vernon D. Grieve, Seattle, Wash.

Application June 25, 1951, Serial No. 233,413

5 Claims. (Cl. 294—16)

This invention relates to handles of the gravity actuated gripping type wherein the weight of a container over which a handle is placed draws the ends of the handle together into positive gripping relation with the ends of the container whereby it is only necessary to drop the handle over a container and draw the handle upwardly to positively grip and hold the container.

The purpose of this invention is to provide a self gripping handle wherein jaws at the opposite ends of the handle are secured together by a coil spring positioned over the ends of sections of the handle and which provides means for resiliently holding the sections together.

Various types of handles of this type have been developed, most of which are patterned after the conventional ice tongs and where the sections of the handle are pivotally connected a definite distance is established between the gripping jaws at the ends of the handle and this does not provide means for compensating for variation in the length of boxes particularly such as apple boxes where the thickness of the shook varies.

The object of this invention is, therefore, to provide means for forming a flexible connection between sections of a handle whereby a limited amount of resiliency is provided in the handle to compensate for variations in the length of containers.

Another object of the invention is to provide a positive gripping handle with means for flexibly connecting the parts wherein the handle is adapted to be used on containers of different sizes.

A further object of the invention is to provide a gravity actuated gripping handle in which gripping jaws on the ends of the handle are resiliently held in operative position by a coil spring.

A further object of the invention is to provide a gravity actuated gripping handle in which gripping jaws of the handle are resiliently connected, which is of a simple and economical construction.

With these and other objects and advantages in view the invention embodies a handle having an arcuate upwardly bowed intermediate section with depending gripping jaws carried by the ends and with the handle portions separated, forming two sections, and in which the separated sections are connected by a coil spring.

Other features and advantages of the invention will appear from the following description taken in connection with the drawings wherein:

Figure 1 is a side elevational view of the improved handle with the handle illustrated on a container such as an apple box and with portions of the ends of the box broken away and shown in section to illustrate the gripping action of the jaws on the ends of the handle.

Figure 2 is a longitudinal section on an enlarged scale through an intermediate part of the handle illustrating the coil spring connecting sections of the handle.

Figure 3 is a side elevational view of the section shown in Figure 2 also illustrating the coil spring connecting the sections of the handle.

Figure 4 is a cross section through the handle shown on an enlarged scale taken on line 4—4 of Figure 3.

Figure 5 is a view illustrating a modification wherein a handle is formed with jaws on the ends of pivotally connected sections and with the pivotal connection positioned in a sleeve providing means for gripping the handle.

Referring now to the drawings wherein like reference characters denote corresponding parts the improved container handle of this invention is formed with tubular sections 10 and 11 connected by a coil spring 12 with pins 13 and 14 securing the ends of the spring to the ends of the sections of the handle and with the extended ends of the sections of the handle provided with jaws 15 and 16 with gripping prongs 17 and 18, respectively, on the lower ends thereof.

The handle is formed with an upwardly bowed center section providing clearance for the fingers of a hand below the intermediate part of the handle and from the center section the ends of the handle extend outwardly with arcuate sections on the ends on which the gripping jaws 15 and 16 are carried.

It is preferred to form the handle in tubular sections however it will be understood that the material forming the handle may be of any suitable shape or design.

In the design illustrated in Figure 5 a handle is illustrated which is formed of sections 19 and 20, the ends of which are provided with gripping jaws 21 and 22, respectively and the jaws are similar to the jaws 15 and 16, shown in Figure 1. The inner ends of the sections 19 and 20 of the handle are pivotally connected by a pin 23 and a sleeve 24 is positioned over the pin to facilitate gripping the handle for carrying a box or other container.

The sleeve 24 is provided with a restricted area 25 at the center with the inner surface gradually enlarging toward the ends providing frusto-conical shaped sections 26 and 27 in the ends of the sleeve.

With the parts particularly as illustrated in

Figures 1 to 4 inclusive the handle has sufficient flexibility whereby the jaws are spread as the handle is placed over a box and as an upward force is applied to the center of the handle the prongs 17 and 18 of the gripping jaws are forced into the material of the box whereby the box is positively gripped and may readily be carried by the handle.

With handles formed in this manner it is only necessary to force the handles downwardly over an apple box or other container and immediately draw the handle upwardly to lift the box. By this means the percentage of damaged fruit caused by dropping boxes is reduced to a minimum and the swamping time, particularly in handling apple boxes, is also substantially reduced.

Although the handle is illustrated and described as particularly adapted for use with apple boxes it will be appreciated that the handle may be used on containers of other types and designs and may also be used for other purposes.

It will be understood that modifications may be made in the design and arrangement of the parts without departing from the spirit of the invention.

What is claimed is:

1. A handle having an upwardly bowed arcuate intermediate section with depending gripping jaws at the ends, said handle comprising separated sections, and a coil spring connecting the said separated sections.

2. A container lifting handle comprising an end section having an upwardly bowed portion therein and an end section extended from the end of the said upwardly bowed portion of the former end section, said end sections having depending gripping jaws secured on the ends thereof, and a coil spring positioned over the adjacent ends of the sections for retaining the sections in assembled relation to form a handle.

3. A container lifting handle comprising an end section having an upwardly bowed portion therein and an end section extended from the end of the said upwardly bowed portion of the former end section, said end sections having depending gripping jaws secured on the ends thereof, a coil spring positioned over the adjacent ends of the sections for retaining the sections in assembled relation to form a handle, and pins extended through the ends of the sections of the handle and also through the ends of the said coil spring.

4. In a handle, the combination which comprises a handle section having a gripping jaw on one end thereof, another handle section also having a gripping jaw on the end thereof, a coil spring extended over adjoining ends of the said handle sections, and pins extended through the ends of the spring and through the said handle sections.

5. In a removable container handle, the combination which comprises an end section having a gripping jaw extended therefrom and having an arcuate section therein, a handle section also having a gripping jaw extended therefrom positioned to coact with the arcuate section of the former handle section to form a handle, and a coil spring positioned over the ends of the handle sections opposite to the ends on which the gripping jaws are positioned for retaining the sections in assembled relation.

VERNON D. GRIEVE.

REFERENCES CITED

The following references are of record in the file of this patent:

UNITED STATES PATENTS

| Number | Name | Date |
|---|---|---|
| 63,086 | Peebles | Mar. 19, 1867 |
| 755,044 | Rafield | Mar. 22, 1904 |
| 1,832,409 | Mueller | Nov. 17, 1931 |
| 1,948,202 | Chapman | Feb. 20, 1934 |
| 2,520,861 | Stone | Aug. 29, 1950 |